(12) United States Patent
Max

(10) Patent No.: US 9,797,545 B2
(45) Date of Patent: Oct. 24, 2017

(54) INTERRETRACTABLE FOLDING STAND

(75) Inventor: David Michael Max, Shadow Hills, CA (US)

(73) Assignee: H56, Inc., Santa Monica, CA (US)

( * ) Notice: Subject to any disclaimer, the term of this patent is extended or adjusted under 35 U.S.C. 154(b) by 732 days.

(21) Appl. No.: 14/081,820

(22) PCT Filed: Jun. 6, 2012

(86) PCT No.: PCT/US2012/041025
§ 371 (c)(1),
(2), (4) Date: Mar. 20, 2015

(87) PCT Pub. No.: WO2013/066413
PCT Pub. Date: May 10, 2013

(65) Prior Publication Data
US 2015/0276121 A1  Oct. 1, 2015

Related U.S. Application Data

(60) Provisional application No. 61/493,678, filed on Jun. 6, 2011.

(51) Int. Cl.
*A47B 97/04* (2006.01)
*F16M 11/38* (2006.01)
*A47B 23/04* (2006.01)
*F16M 11/04* (2006.01)
*A47F 5/10* (2006.01)

(52) U.S. Cl.
CPC ............. *F16M 11/38* (2013.01); *A47B 23/04* (2013.01); *A47B 23/043* (2013.01); *A47B 23/044* (2013.01); *A47B 97/04* (2013.01); *F16M 11/041* (2013.01); *A47F 5/10* (2013.01)

(58) Field of Classification Search
CPC ..... F16M 11/38; F16M 11/041; A47B 23/043
USPC ........................................ 248/462, 460, 443
See application file for complete search history.

(56) References Cited

U.S. PATENT DOCUMENTS

| | | | | |
|---|---|---|---|---|
| 5,973,244 A | * | 10/1999 | McCulloch | G10G 5/00 248/121 |
| 7,514,616 B2 | * | 4/2009 | Sawhney | G10G 5/00 248/443 |
| 9,010,700 B1 | * | 4/2015 | Cooper | G10G 5/00 248/166 |

* cited by examiner

Primary Examiner — Todd M Epps
(74) Attorney, Agent, or Firm — Sean D. Burdick

(57) ABSTRACT

An interretractable stand includes outer and inner pairs of mirror-image members. Each member of the outer pair rotatably connects to a member of the inner pair. The members of the outer pair are hingedly connected, and the members of the inner pair are hingedly connected, so that the inner pair when fully rotatably misaligned with respect to the outer pair allows the inner and outer pairs to be hingedly separated to an open position, and so that the inner pair when fully rotatably aligned with respect to the outer pair rests between members of the outer pair in a closed position. When open the outer members provide two tripod feet and a backrest, and the inner members provide a third tripod foot and a carriage, forming a stand for supporting a musical instrument, canvas, book, or board. When closed the inner members align between the outer members for easy carrying and storage. A top pair of mirror-image hingedly connected members may be rotatably connected to respective outer pair members to extend the backrest.

20 Claims, 8 Drawing Sheets

INTERRETRACTABLE FOLDING STAND

This application claims priority to U.S. Provisional Application No. 61/493,678, which was filed Jun. 6, 2011, and which is fully incorporated herein by reference.

BACKGROUND OF THE INVENTION

Field of the Invention

The present invention relates to mechanical stands for supporting or displaying objects such as musical instruments, canvases, books, and signage. More specifically, the invention relates to such a stand having interretractable folding parts.

Description of the Related Art

Mechanical stands for supporting objects come in a wide variety of sizes, shapes, and materials. The design of the stand typically depends on the object, or class of objects, being supported. Stand designs continue to evolve along with the design of supportable objects.

The problem being solved by the present invention is that of constructing a general purpose collapsible stand that when fully expanded provides a high degree of stability for supporting or displaying objects and that when fully collapsed occupies a minimal size for easy carrying and storage.

SUMMARY OF THE INVENTION

The present invention provides an elegantly mechanically engineered design for meeting the above objectives. An interretractable folding stand according to the invention includes outer and inner pairs of mirror-image members. Each member of the outer pair is rotatably connected to a member of the inner pair. The members of the inner pair are hingedly connected, so that the inner pair when fully rotatably misaligned with respect to the outer pair allows the inner and outer pairs to be hingedly separated to an open position. The inner pair when fully rotatably aligned with respect to the outer pair rests between members of the outer pair in a closed position. In the open position, the members of the outer pair form two feet of a tripod and a backrest, and the members of the inner pair form a third foot of the tripod and a carriage. In an exemplary open position, with the tripod resting on a horizontal surface, the backrest forms an angle of about 105 degrees with respect to the horizontal surface, the carriage forms an angle of about 15 degrees with respect to the horizontal surface, and the backrest forms an angle of about 90 degrees with respect to the carriage, forming a stand for supporting a musical instrument, canvas, book, board or other object. In the closed position, the members of the outer pair align with and contact one another, forming a channel for enclosing the inner pair.

Each member of the outer pair may include a leg portion and a spine portion, with the leg forming an obtuse angle of about 155 degrees with respect to the spine. Each member of the inner pair may include a leg portion and an arm portion, the leg forming the same obtuse angle with respect to the arm.

Each member of the outer pair may further comprise a shelf configured to arrest rotation of the rotatably connected member of the inner pair when fully rotatably aligned and when fully rotatably misaligned. The shelf may have a width substantially equivalent to a width of an inner member, so that in the closed position, the shelves contact one another and form a channel between the outer members of sufficient width to accommodate the inner members with a snug fit. Mirror-image member pairs may define alignment holes and one or more dowels may be provided for guiding the pair into alignment by engaging opposing alignment holes when the stand is in the closed position.

In another variation, the interretractable folding stand includes a top pair of mirror-image members, and each member of the top pair is rotatably connected to a member of the outer pair. The members of the top pair are hingedly connected, so that the top pair, when fully rotated from a closed position between the members of the outer pair to a fully extracted position, allows the top, inner and outer pairs to be hingedly separated to the open position. In the open position, the top pair of mirror-image members extends the height of the backrest of the stand. In the closed position, the top pair members align with the outer members without interfering with the inner members, so that the stand may be collapsed to a minimal size for easy carrying and storage.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

DETAILED DESCRIPTION

Generally speaking, the present invention for an interretractable folding stand utilizes a design that can be applied to many types of utility stands, including easels, book stands, computer stands, music stands, musical instrument stands, poster stands, and similar apparatus. The design may also be used in furniture such as chairs. The design uses flat stock materials cut into shapes that stack together in multiple layers. In one embodiment, the outer layers, or outer members, are formed in an angular shape, similar to a boomerang. When the outer members are closed together, they house the interior parts, for example, a pair of inner members or a pair of top members, or both types of pairs. When the stand is fully open, the outer members serve as a backrest and provide two feet of a tripod, the inner members serve as a carriage and provide the third foot of the tripod, and the top members (if present) serve as a head stock or back rest extension. The interior parts are attached to the outer members via pins or roll-over rivets allowing the parts to rotate with respect to the outer members. The outer members are hinged at near the top, or the top members (if present) are instead hinged together at one end opposite the riveted end where they connect to the outer members, allowing the top members to spread the outer members apart when open. To open, the inner members are rotated outside of the outer members, and only when all hinges are properly aligned is the stand able to be spread into the fully open, or standing position. Advantages of the design are its compact size when fully closed and its elegant and aesthetically pleasing stance when fully open. Alternative applications of the design include additional swivel elements such as arms for a chair, flip-out page holders for a cook book stand, and hooked arms for providing better stability for items supported on the carriage.

The term "interretractable" as used herein denotes an apparatus comprising multiple components that are retractable "among themselves". To further illuminate this definition, consider a conventional apparatus having a retractable feature, such as a telescope or an electrical appliance (e.g., a vacuum cleaner or an iron) equipped with a retractable power cord. The inner cylinders of the telescope may retract within the outer cylinder, but the outer cylinder itself does not retract or collapse. Similarly, the cord when played out is retractable within the chassis of the appliance; however, the chassis itself is not retractable and does not fold or collapse. In contrast, an interretractable apparatus comprises one or more parts that may be retracted within other parts of the apparatus that fold or collapse into a smaller space to accommodate the one or more retracted parts.

Figure 1:
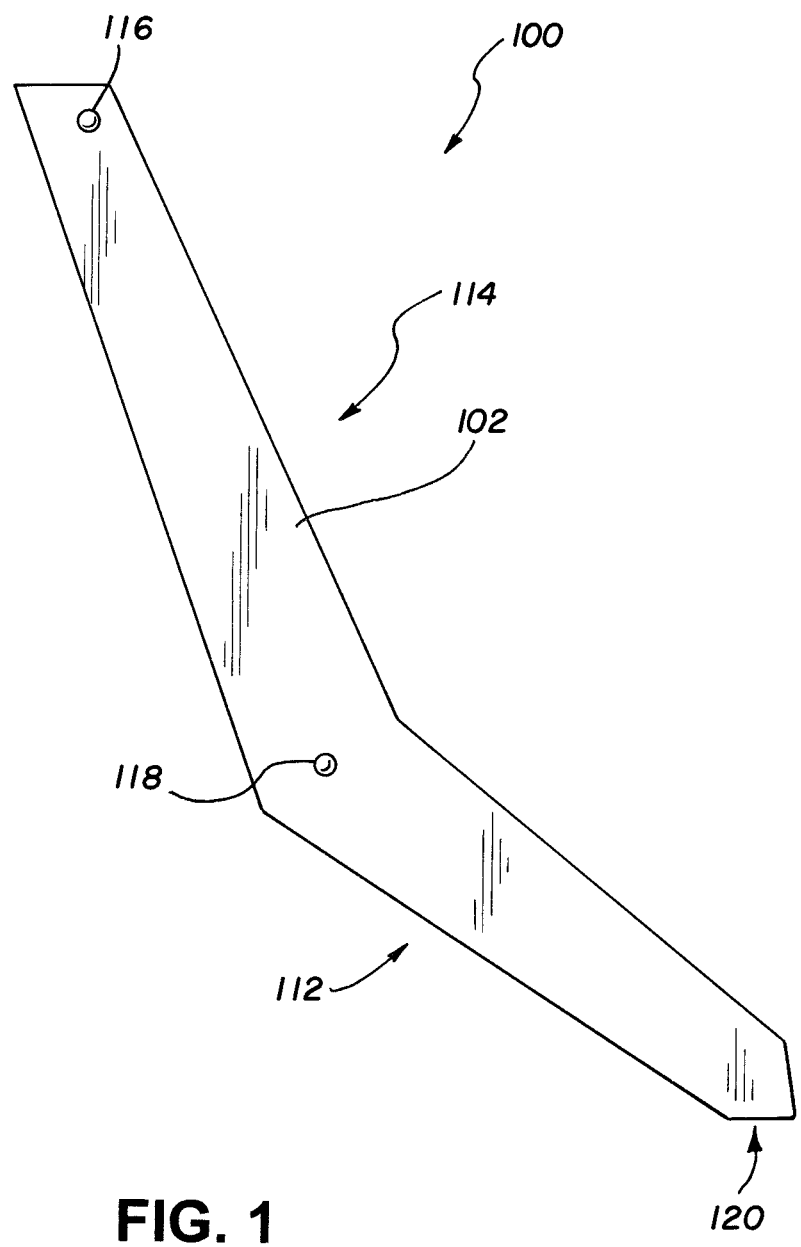
FIG. 1 is a side view of one embodiment of an interretractable folding stand according to the invention, showing the stand in a fully closed or fully retracted position.

An example of an interretractable folding stand according to the invention that illustrates this property is shown in FIGS. 1 through 6. In FIG. 1, the stand is fully closed or retracted and in FIG. 6, the stand is fully open. Notice that in the fully open position in FIG. 6, the stand does not present a chassis or cavity into which any of its parts may be retracted. As shown in the intervening figures, the parts may be collapsed into the fully closed position of FIG. 1 through a succession of manipulations of the parts of the stand, consisting or simple rotational or folding movements. In the fully closed position the outer members come together to form a channel into which the interior parts may be retracted, much like the blades of a pocket knife are retracted within the handle of the knife.

A first embodiment of an interretractable folding stand is shown in FIGS. 1 through 6. The figures also show manufacturing details of the individual components parts, i.e., the outer, inner and top members. This embodiment is well-suited to serve, for example, as an easel or as a stand for a musical instrument such as a guitar.

FIG. 1 is a side view of one embodiment of an interretractable folding stand 100 according to the invention. Stand 100 is shown here in a fully closed or fully retracted position. Because other parts of the stand 100 are retracted and rotatably aligned to an outer member 102, only the outer side of the outer member 102 can be seen in this view. Outer member 102 is an angled member formed preferably from flat stock, and having a leg portion 112 extending at an obtuse angle from a spine portion 114. The inner surface of the spine portion 114 may serve as a backrest, as will be illustrated in more depth hereafter.

Near the top end of the spine portion 114, outer member 102 may define a hole 116, for accommodating a pin or rivet, to enable the outer member to be rotatably connected to a top member. Near the junction of the leg 112 and the spine 114, the outer member 102 may define another hole 118 for accommodating a similar pin or rivet, to enable the outer member to be rotatably connected to an inner member. At the base of the leg portion 112, the outer member 102 may terminate in a flat foot portion 120. As will be seen, the foot portion 120 forms the foot of a tripod when the stand 100 is extracted and folded to the fully open position.

Figure 2:
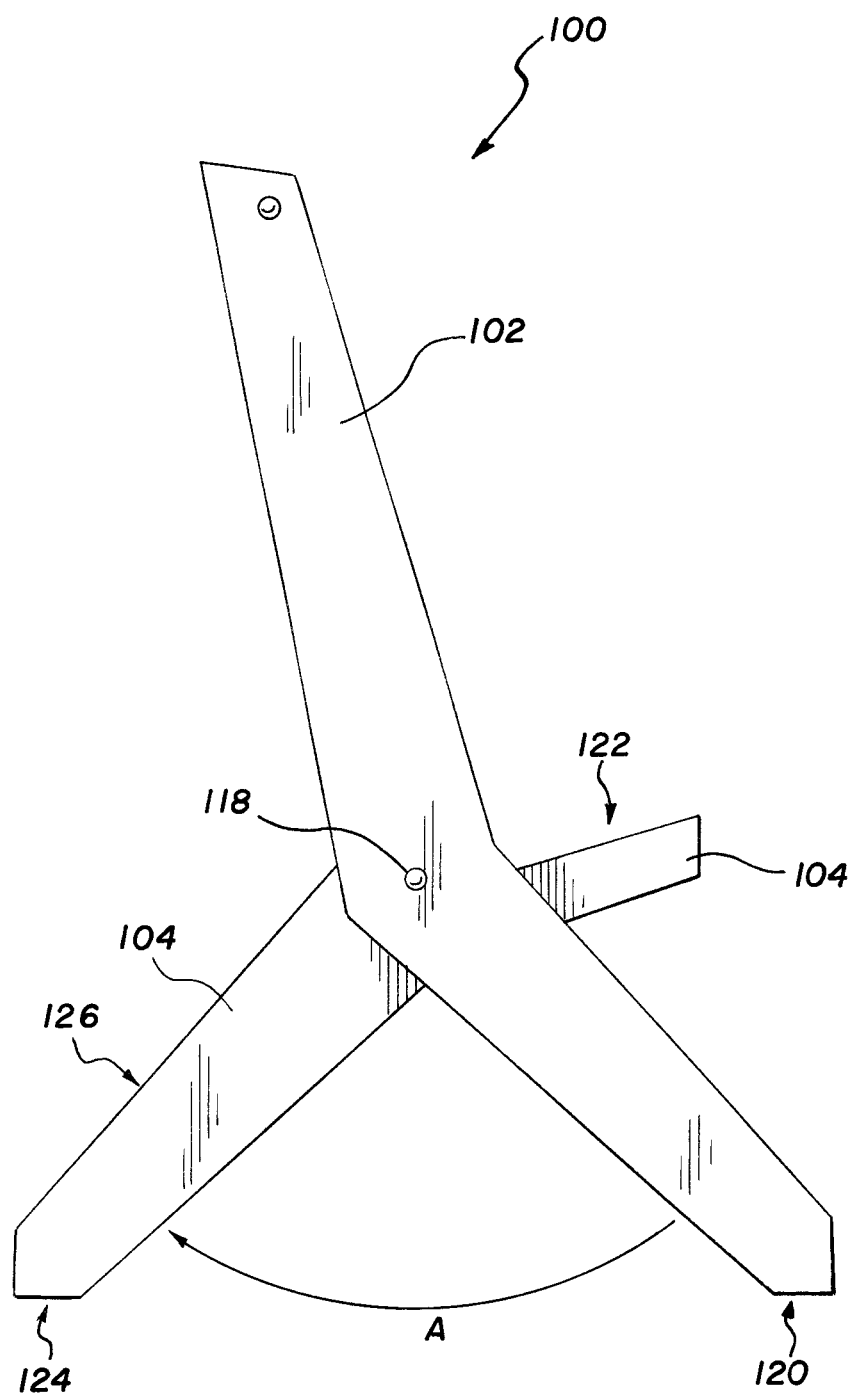
FIG. 2 is a side view of the interretractable folding stand of FIG. 1, showing an inner member rotatable misaligned with respect to an outer member.

FIG. 2 is a side view of the interretractable folding stand 100. This view shows an inner member 104 rotatable misaligned with respect to the outer member 102. The inner member 104 includes an arm portion 122 and a leg portion 126 that extends at an obtuse angle from the arm portion 122, as shown. The arm portion 122 forms a carriage for supporting objects resting on the stand.

To achieve the misalignment shown in FIG. 2, the inner member 104 is rotated from the closed or retracted position shown in FIG. 1 about the pivot point coincident with hole 118. Accordingly, through this movement the leg portion 126 of the inner member 104 will rotate with respect to the outer member 102 in the direction indicated at A. When inner member 104 is fully rotated in direction A, a flat foot portion 124 of the inner member 104 rests approximately in the same horizontal plane as the flat foot portion 120 of the outer member 102. These foot portions form two of three feet of a tripod that support the stand 100.

Figure 3:
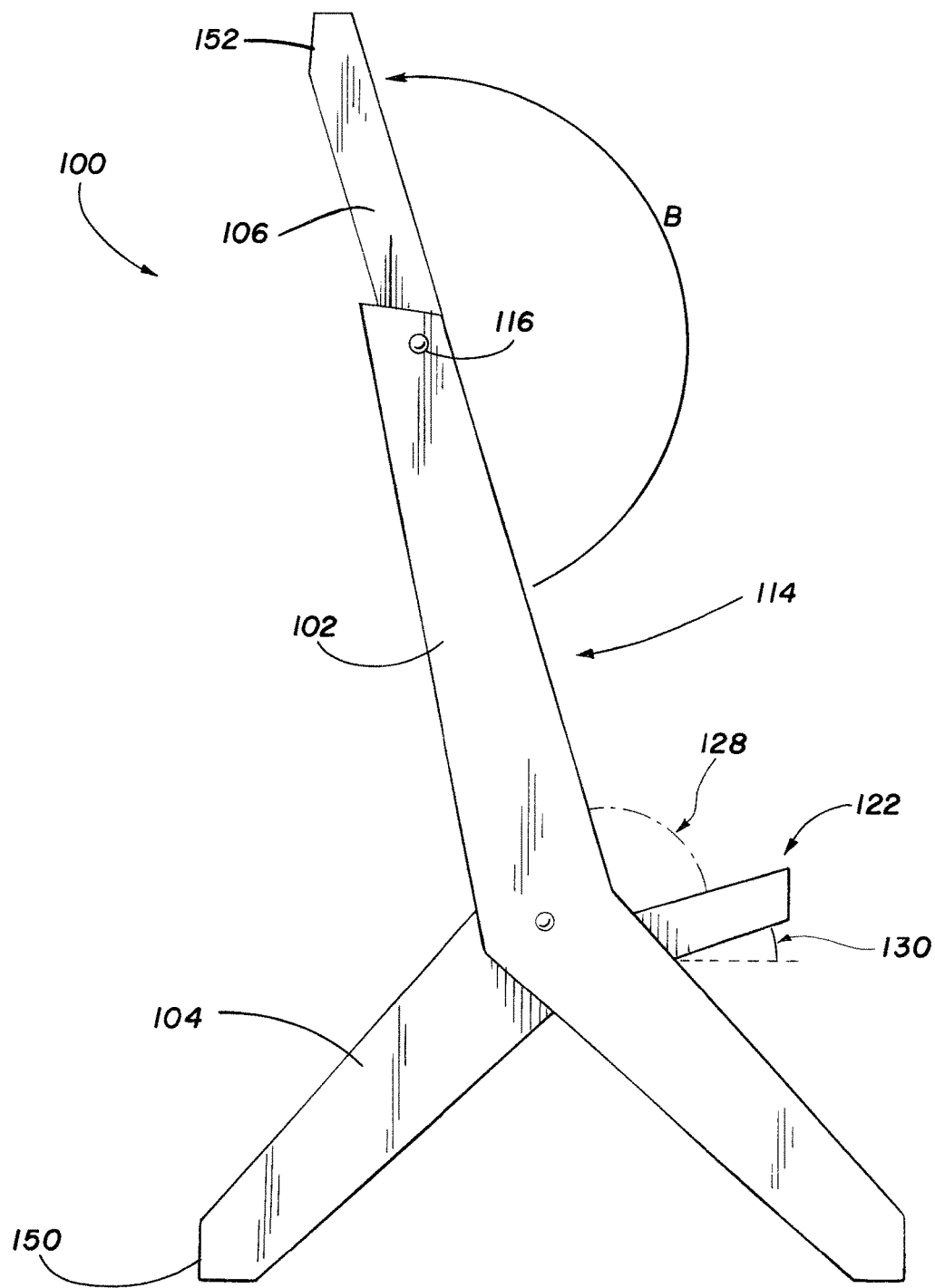
FIG. 3 is a side view of the interretractable folding stand of FIG. 1, showing a top member rotated to a fully extracted position.

FIG. 3 is another side view of the interretractable folding stand 100. This view shows a top member 106 rotated from the closed or retracted position shown in FIG. 1 about the pivot point coincident with hole 116 in the direction B to a fully extracted position. In the fully extracted position, top member 106 aligns with the spine portion of outer member 102 to form an extension of the backrest portion of the stand, as shown.

Also in the fully extracted position, the arm portion 122 of the inner member 104 forms an angle 128 with respect to the backrest (i.e. the spine portion 114) between about 90 degrees and about 120 degrees. In one embodiment, this angle may be set to about 105 degrees. Also in this position, the arm portion 122 forms an angle 130 with respect to the horizontal between about 10 degrees and about 30 degrees. In one embodiment, this angle may be set to about 20 degrees. Accordingly, in this position the backrest may form an angle with respect to the horizontal between about 60 degrees and about 150 degrees. In one embodiment, this angle may be set to about 105 degrees.

Herein, the term "about" when used to approximate dimensions such as angles is intended to allow for a reasonable amount of tolerance or variation in design without departing from the essence of the invention. Mathematical exactness in describing dimensions of the constituent parts of an interretractable stand is not required, so long as the functional operation of the interretractable stand is achieved.

Figure 4:
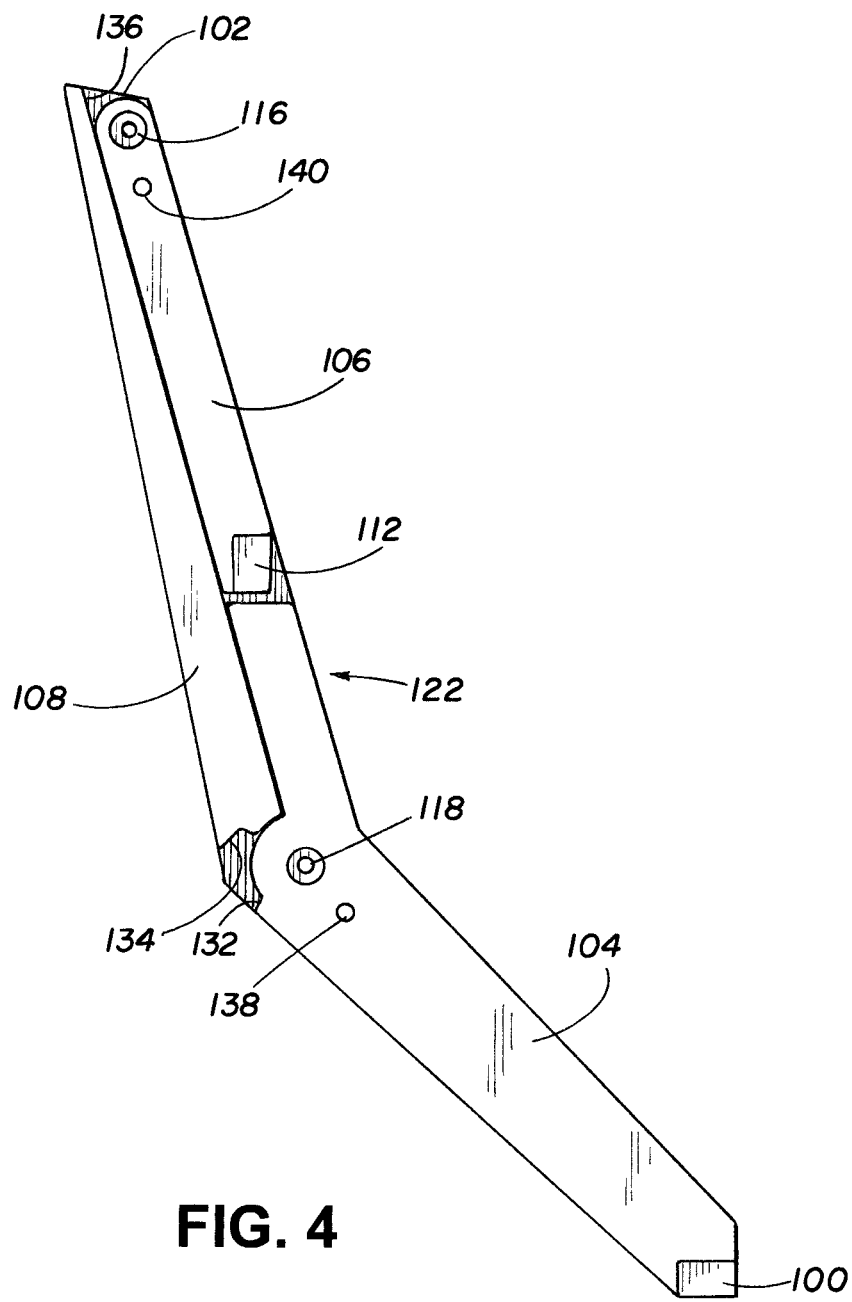
FIG. 4 is a cutaway side view of the interretractable folding stand of FIG. 1, showing a single outer member, a single inner member, and a single top member in a closed position in which the inner member and the top member are aligned with the outer member.

FIG. 4 is a cutaway side view of the interretractable folding stand 100. This view shows a single outer member 102, a single inner member 104, and a single top member 106, all oriented in a closed position in which the inner member 104 and the top member 106 are aligned with the outer member. Thus, FIG. 4 shows one half of the stand 100, such that the missing half is a mirror-image of the half that is shown.

In this view, several important functional elements of the stand 100 are shown. The outer member 102 includes a shelf 108 that protrudes out of the page. The shelf 108 arrests rotation, in both rotational directions, of both the inner member 104 and the top member 106.

Consider first the inner member 104. When rotated counterclockwise into the fully closed position, as shown, the arm portion 122 abuts the shelf 108 and thus the shelf limits the counterclockwise rotation of the inner member. When the inner member is rotated in a clockwise direction, a notch 132 formed in the inner member near the pivot point 118 engages a cooperating notch 134 formed in a lower end of the shelf 108. This engagement occurs when the inner member 104 is rotated to the fully misaligned or fully open position, and thus the shelf 108 also limits clockwise rotation of the inner member with respect to the outer member.

Now consider the top member 106. When rotated clockwise into the fully closed position, as shown, one side of the top member 106 abuts the shelf 108 and thus the shelf limits the clockwise rotation of the top member. When the top member is rotated in a counterclockwise direction, the top end 136 of the shelf 108 abuts an opposite side of the top member 106 and thereby limits any further rotation of the top member beyond about 180 degrees from its fully closed position.

FIG. 4 also shows rectangular cutouts 110 and 112. Cutout 110 is formed at the foot of inner member 104, and cutout 112 is formed at the top of the top member 106. These cutouts each provide a recessed mounting surface for half of a hinge bracket. In each case, the mounting surface may be recessed so that when a hinge is installed, the hinge bracket will not protrude beyond the width of the member to which it is connected. This ensures that the members can be folded and rotated to achieve the desired open and closed positions without interference.

Alignment holes are also shown. In this embodiment, alignment holes 138 and 140 may be defined in any convenient location along the side of the inner member 104 and along the side of the top member 106, respectively. These holes are optional, and various embodiments of interretractable folding stands according to the invention may include any number of such holes.

A dowel or pin 148 (FIGS. 6) is anchored within one of a complimentary pair of opposing alignment holes, so that when pairs of inner or top members are folded to the closed position, the dowel guides the members into proper alignment by engaging the opposite alignment hole.

Figure 5:
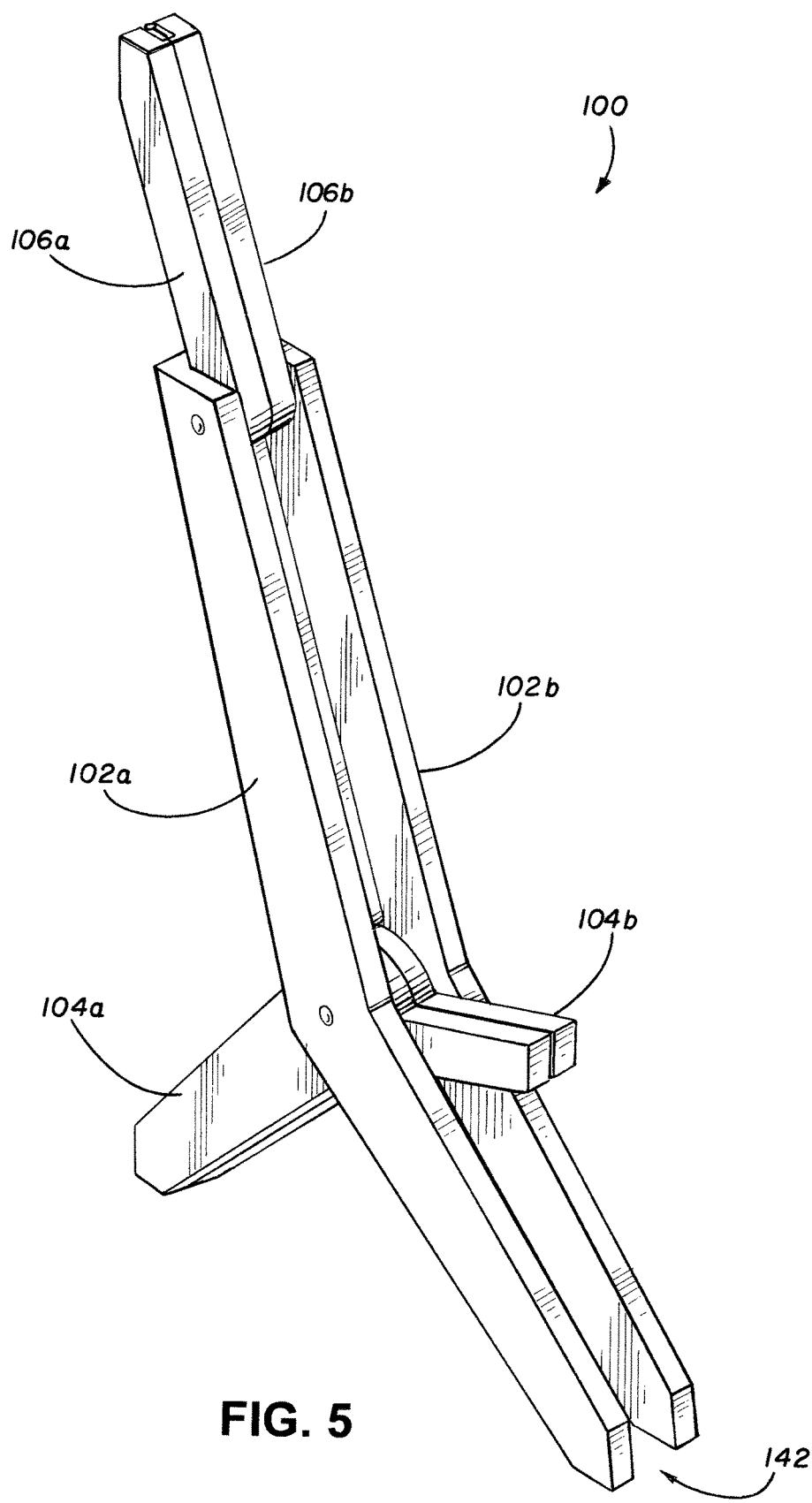
FIG. 5 is a perspective view of the interretractable folding stand of FIG. 1, showing the stand in an extracted position, with an inner member pair rotatably misaligned with respect to an outer member pair, and with a top member pair fully extracted.

FIG. 5 is a perspective view of the interretractable folding stand 100. This view shows the stand in an extracted position, with an inner member pair 104a, 104b rotatably misaligned with respect to an outer member pair 102a, 102b and with a top member pair 106a, 106b fully extracted. In the extracted position as shown, or in the fully closed (retracted) position, the outer member pair 102a, 102b form a channel 142 that is sized to at least partially enclose and snugly accommodate the inner and top member pairs. This sizing may be achieved by each shelf 108 having a width approximately equal to the width of an inner member or a top member.

With the inner member pair 104a, 104b fully rotatably misaligned with respect to the outer member pair 102a, 102b, as shown, and with the top member pair 106a, 106b fully extracted, as shown, the interretractable stand 100 is in a position that permits the mirror-image members to be hingedly separated so that the stand may be manipulated to the fully open position. As will be apparent in the next figure, unless the stand 100 is fully extracted, and the upper and lower hinges properly aligned, the hinges will not cooperate to allow the stand to be opened.

Figure 6:
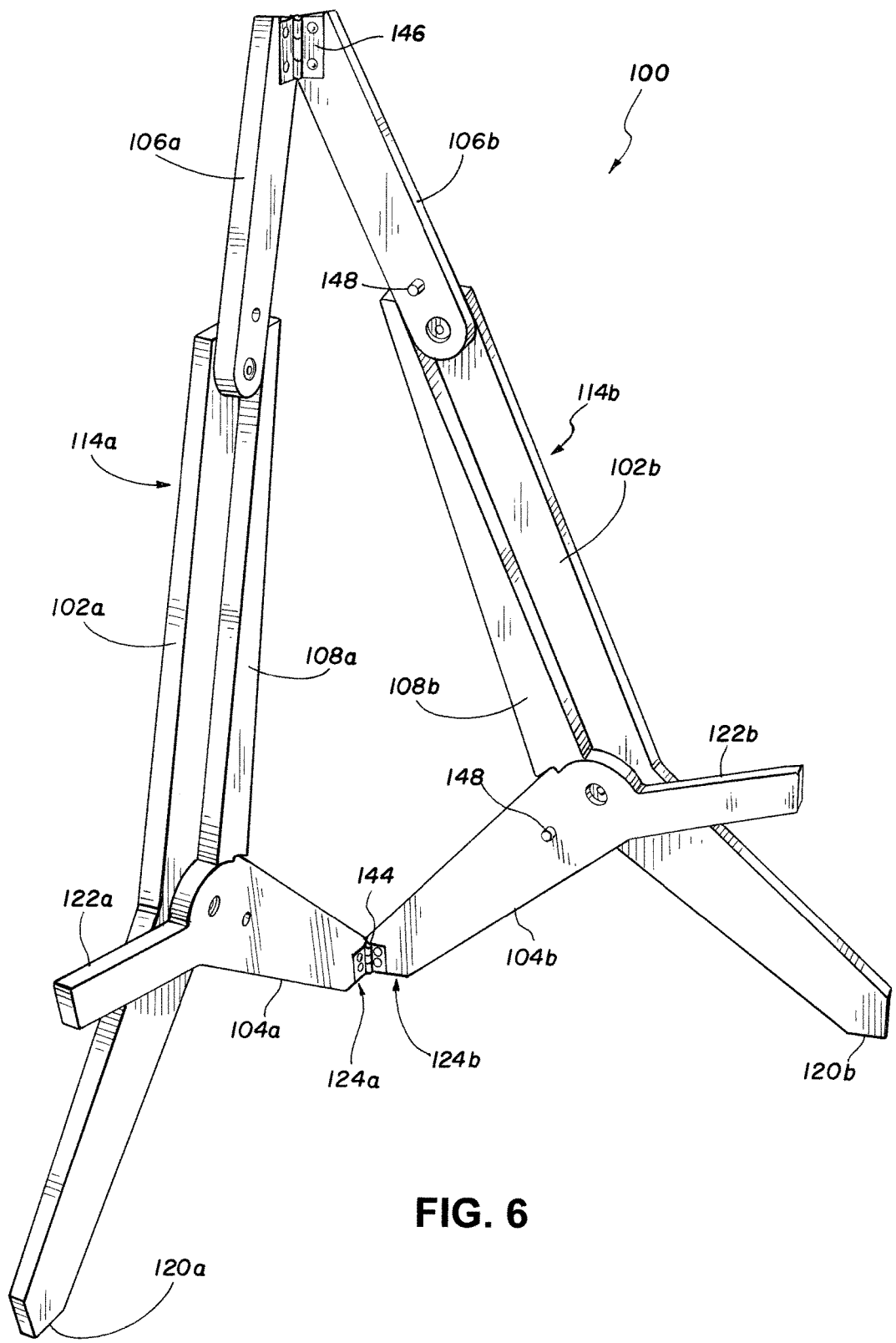
FIG. 6 is a perspective view of the interretractable folding stand of FIG. 1, showing the stand in a fully open position, with inner, outer, and top pairs hingedly separated.

FIG. 6 is a perspective view of the interretractable folding stand 100. This view shows the complete stand in a fully open position, with the inner (104a, 104b), outer (102a, 102b), and top (106a, 106b) member pairs each hingedly separated. In this position, the stand 100 may bear a load that rests on the carriage formed by arms 122a, 122b and against the backrest formed by spine portions 114a, 114b and top members 106a, 106b. A stable tripod configuration is formed by first foot 120a, second foot 120b, and a third foot formed by the combination of feet 124a and 124b.

The inner members 104a, 104b are hingedly connected by a lower hinge 144 that attaches near the feet 124a and 124b. On each of these members, a mating surface 150 (FIG. 3) limits the span of rotational separation of member 104a from member 104b, by interference against an opposing mating surface 150. Similarly, the top members 106a, 106b are hingedly connected by an upper hinge 146 that attaches near the top of the top members, as shown. On each of these top members, a mating surface 152 (FIG. 3) limits the span of rotational separation of member 106a from member 106b, by interference against an opposing mating surface 152.

According to the invention, in all hingedly separated positions that span from the fully retracted position to the fully open position, the axes of the upper and lower hinges are substantially aligned and therefore operable to allow the members to be hingedly separated. When hingedly separated to an open position, the opposing rotational axes 116 and the opposing rotational axes 118 become misaligned, and this prevents the top members from rotating with respect to the outer members and prevents the inner members from rotating with respect to the outer members. From the extracted position, once the inner members or top members are rotated about 116 or 118 toward the retracted position, the hinges become misaligned and cannot operate.

In operation, therefore, starting with the stand in the fully retracted position, a user must first rotate the top and inner members to the fully extracted position to align the hinges, and then fold the members outward to achieve the fully open position and form the tripod. To collapse the stand, the same procedure is followed in reverse.

Figure 7:
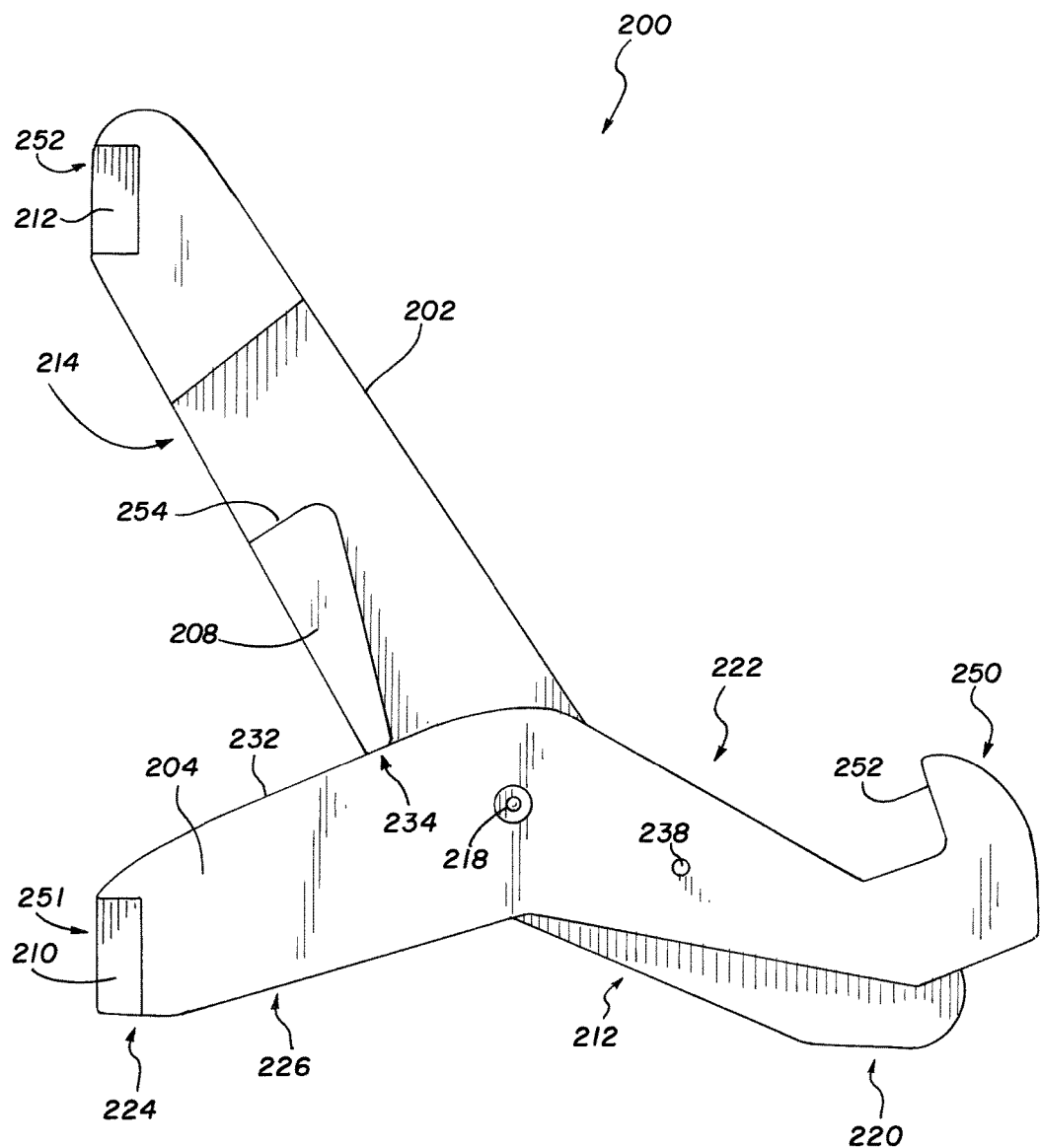
FIG. 7 is a cutaway side view of another embodiment of an interretractable folding stand according to the invention, showing a single inner member rotatably misaligned with respect to a single outer member.
Figure 8:
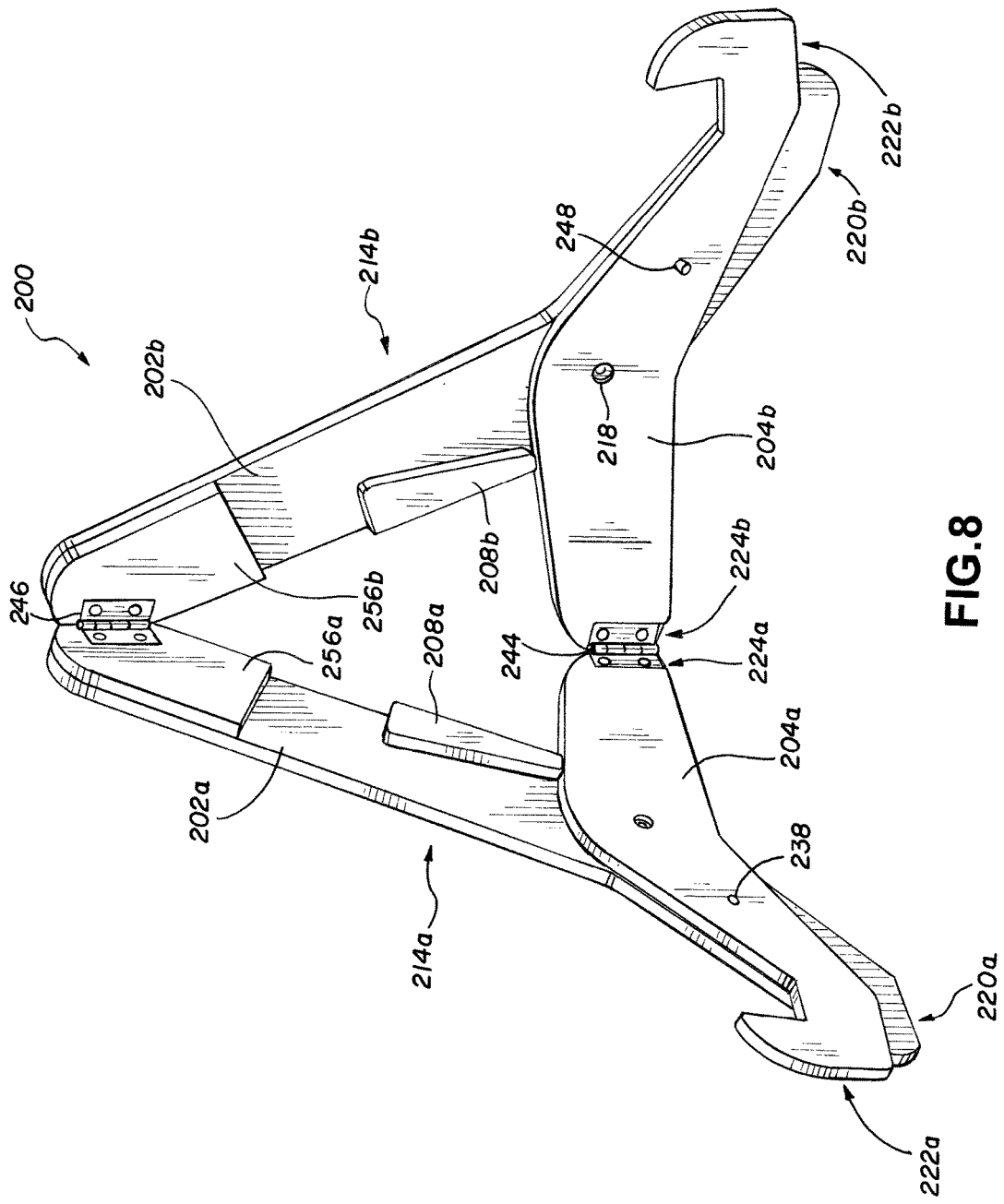
FIG. 8 is a perspective view of the interretractable folding stand of FIG. 7, shown in a fully open position.

FIGS. 7 and 8 illustrate a second embodiment of an interretractable folding stand according to the invention. These figures show examples of manufacturing details of individual components parts for a more basic embodiment in which the top members have been eliminated, and in which the main structural parts of the stand 200 comprise only an inner member pair and an outer member pair. This embodiment is well-suited to serve as a stand for supporting iPads, small canvases, signs, or books.

FIG. 7 is a cutaway side view of the second embodiment of an interretractable folding stand 200. This view shows a single inner member 204 rotatably misaligned with respect to a single outer member 202, which together form one mirror-image half of the stand 200. The design and operation is similar to stand 100.

The outer member 202 includes a leg portion 212 and a spine portion 214 that extends from and forms an obtuse angle with respect to the leg portion 212. A flat foot portion 220 is formed at the lower end of the leg portion 212. The inner member 204 includes a leg portion 226 and an arm portion 222 that extends from and fors an obtuse angle with respect to the leg portion 226. A flat foot portion 224 is formed at the lower end of leg portion 226. The inner member 204 also includes a hook 250 formed at the end of arm 222, to provide a more secure means for retaining a load on the stand, to prevent slippage of an item such as an iPad, to maintain open the pages of a book, etc.

A shelf 208 on the outer member 202 protrudes from the page and is configured to limit rotation of the inner member 204 in both of two opposite rotational directions. In the position shown, the inner member 204 is fully rotated to the extracted position, or to the open position, depending on whether member pairs are, respectively, folded closed or folded open. In this position, the upper edge 232 of the leg portion 226 abuts the lower edge 234 of the shelf 208 at the counterclockwise rotational limit.

In the closed position (not shown), the inner member 204 is rotated clockwise to the opposite rotational limit. That limit is reached when edge 252 of hook 250 comes into contact with the upper edge 254 of shelf 208. The inner member 204 reaches either limit by rotating about the pivot point 218, which is a hole defined in the inner member that is sized to accommodate a pin or rivet that rotationally connects the inner member 204 to the outer member 202. A second hole 238 defined in the inner member 204 may be provided as an alignment hole which cooperates with a dowel 248 to guide and engage inner member pairs when the stand 200 is folded from the open position to the extracted position.

A hinge recess 210 is formed at the lower end of leg 226 on the inner member 202. Another hinge recess is formed at the upper end of spine portion 214 of the outer member 202. The hinge recesses are sized to accommodate hinge brackets so that the brackets, when installed, do not protrude from the width of an inner or outer member.

FIG. 8 is a perspective view of the interretractable folding stand 200. This view shows the complete stand 200 in a fully open position with inner (204a, 204b) and outer (202a, 202b) member pairs each hingedly separated. In this position, the stand 200 may bear a load that rests on the carriage formed by arms 222a, 222b and against the backrest formed by spine portions 214a, 214b. A stable tripod configuration is formed by first foot 220a, second foot 220b, and a third foot formed by the combination of feet 224a and 224b. The stand may be designed to achieve various desired angles of functional significance, to customize the stand for a particular load. For example, the angle of the backrest with respect to the horizontal, the angle of the backrest with respect to the arm, the angle of the arm with respect to the horizontal, and the angle of the leg with respect to the horizontal, may be adjusted in the design without departing from the salient features of the invention.

The inner members 204a, 204b are hingedly connected by a lower hinge 244 that attaches near the feet 224a and 224b. Similarly, the outer members 202a, 202b are hingedly connected by an upper hinge 146 that attaches near the top of the top members, as shown. On each of these top members, a mating surface 152 (FIG. 3) limits the span of rotational separation of member 106a from member 106b, by interference against an opposing mating surface 152. According to the invention, in all hingedly separated positions that span from the fully retracted position to the fully open position, the axes of the upper and lower hinges are substantially aligned.

The inner members 204a, 204b are hingedly connected by a lower hinge 244 that attaches near the feet 224a and 224b. On each of these members, a mating surface 250 (FIG. 7) limits the span of rotational separation of member 204a from member 204b, by interference against an opposing mating surface 250. Similarly, the outer members 202a, 202b are hingedly connected by an upper hinge 246 that attaches near the top of the spine portions, as shown. At the top end of each of these spines, a mating surface 252 (FIG. 7) limits the span of rotational separation of member 202a from member 202b, by interference against an opposing mating surface 252. According to the invention, in all hingedly separated positions that span from the fully retracted position to the fully open position, the axes of the upper and lower hinges are substantially aligned.

Stand 200 operates in similar fashion as stand 100. Starting with the stand in the fully retracted position, a user must first rotate the inner members to the fully rotatably misaligned (or fully extracted) position to align the hinges, and then fold the inner and outer members outward to achieve the fully open position and form the tripod. To collapse the stand, the same procedure is followed in reverse. According to the invention, in the closed position the inner members may be rotated with respect to the outer members, but the hinges will not operate. When the inner members are rotated to the fully extracted position, the hinges align to allow the members to be folded open. When the members are folded to the open position to form the tripod, the inner members cannot be rotated with respect to the outer members. This advantageously provides a highly stable yet collapsible stand design.

FIG. 8 also shows the alignment hole 238 and its counterpart dowel 248 that cooperate to align the inner members when hingedly folded from the open position to the extracted position. In the extracted position, the outer members 202a, 202b are in contact with one another as shelves 208a and 208b abut one another and as spacers 256a and 256b abut one another. This creates a channel in the space adjacent to the shelves and between the shelves and spacers, which has a width approximately equal to the width of the inner members. In the extracted position, the channel provides sufficient space for the inner members to be rotated into the channel to achieve the fully closed (or fully retracted) position.

A skilled artisan will appreciate that in one preferred embodiment, the widths of the spacers, shelves and inner members are all approximately equal. These parts may therefore advantageously be machined from the same planar stock material. In another embodiment, the spacer and shelf are integral to the outer member, and formed, e.g. by a machining process, to have approximately the same width as the inner member.

In the foregoing embodiments, the various members of the interretractable folding stand are preferably formed from solid planks of a hardwood. The type of hardwood is preferably chosen for its aesthetic grain pattern, color, and strength. Examples of appropriate hardwoods include ash, cherry, hickory, koa, mahogany, maple, oak, walnut, and wenge. The members of an interretractable stand may also be formed from other materials such as metals and plastics, which should be selected for appropriate hardness and rigidity, depending on the intended end use. Other materials that make up the stand, such as hinges, rivets, and dowels, may be selected from conventional hardware stock.

Other embodiments according to the invention are possible. For example, the principles of the invention may be applied to the construction of a folding chair. The chair may include a seat made from canvas or from some other sturdy fabric for attachment to the arms of the inner members. The chair may also include a second such fabric for attachment to the backrests of the outer members for forming a chair back.

Exemplary embodiments of the invention have been disclosed in an illustrative style. Accordingly, the terminology employed throughout should be read in an exemplary rather than a limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An interretractable stand, comprising:
   outer and inner pairs of mirror-image members;
   a first hinge connecting the members of the outer pair;
   a second hinge connecting the members of the inner pair;
   each member of the outer pair rotatably connected to a member of the inner pair; and
   the members of the outer pair hingedly connected, and the members of the inner pair hingedly connected, so that the inner pair when fully rotatably misaligned with respect to the outer pair allows the inner and outer pairs to be hingedly separated to an open position, and so that the inner pair when fully rotatably aligned with respect to the outer pair rests between members of the outer pair in a closed position;
   wherein, in the open position the first and second hinges cooperate; and
   wherein, in the closed position, the first and second hinges cannot operate.

2. The interretractable stand of claim 1 wherein, in the open position, the members of the inner pair form a first foot of a tripod and the members of the outer pair form second and third feet of the tripod.

3. The interretractable stand of claim 2, wherein, in the open position the members of the inner pair form a carriage and the members of the outer pair form a backrest.

4. The interretractable stand of claim 3 wherein, in the open position and with the first, second, and third feet resting on a horizontal surface, the backrest forms an angle between about 60 degrees and about 150 degrees with respect to the horizontal surface.

5. The interretractable stand of claim 3 wherein, in the open position and with the first, second, and third feet resting on a horizontal surface, the carriage forms an angle between about 10 degrees and about 30 degrees with respect to the horizontal surface.

6. The interretractable stand of claim 3 wherein, in the open position and with the first, second, and third feet resting on a horizontal surface, the backrest forms an angle between about 90 degrees and about 120 degrees with respect to the carriage.

7. The interretractable stand of claim 1 wherein, in the closed position, the members of the outer pair form a channel enclosing the inner pair.

8. The interretractable stand of claim 1 wherein each member of the outer pair comprises a leg and a spine, the leg forming an obtuse angle with respect to the spine.

9. The interretractable stand of claim 1 wherein each member of the inner pair comprises a leg and an arm, the leg forming an obtuse angle with respect to the arm.

10. The interretractable stand of claim 1 wherein each member of the outer pair comprises a shelf configured to arrest rotation of the rotatably connected member of the inner pair when fully rotatably aligned and when fully rotatably misaligned.

11. The interretractable stand of claim 10 wherein the shelf comprises a width substantially equivalent to a width of an inner member.

12. The interretractable stand of claim 10 wherein the shelves of the members of the outer pair contact one another in the closed position.

13. The interretractable stand of claim 1 further comprising:
    a top pair of mirror-image members, each member of the top pair rotatably connected to a member of the outer pair;
    the members of the top pair hingedly connected, so that the top pair, when fully rotated from a closed position between the members of the outer pair to a fully extracted position, allows the top, inner and outer pairs to be hingedly separated to the open position.

14. An interretractable stand, comprising:
    outer, inner, and top pairs of mirror-image members;
    each member of the outer pair rotatably connected to a member of the inner pair and to a member of the top pair; and
    the members of the top pair hingedly connected, and the members of the inner pair hingedly connected, so that the inner and top pairs when fully rotated from a closed position between the members of the outer pair to an extracted position, allow the outer, inner, and top pairs to be hingedly separated to an open position, and so that the inner and top pairs when fully rotated to the closed position align with the members of the outer pair.

15. The interretractable stand of claim 14 wherein, in the open position, the members of the inner pair form a first foot of a tripod and the members of the outer pair form second and third feet of the tripod.

16. The interretractable stand of claim 14, wherein, in the open position the members of the inner pair form a carriage and the members of the outer pair form a backrest.

17. The interretractable stand of claim 16 wherein, in the open position, the members of the inner pair form a first foot of a tripod and the members of the outer pair form second and third feet of the tripod; and wherein, in the open position and with the first, second, and third feet resting on a horizontal surface, the backrest forms an angle between about 80 degrees and about 100 degrees with respect to the carriage.

18. The interretractable stand of claim 14 wherein each member of the outer pair comprises a shelf configured to arrest rotation of the rotatably connected member of the inner pair when the inner pair is fully rotated to the extracted position and when the inner pair is fully rotated to the closed position.

19. An interretractable stand comprising outer and inner pairs of mirror-image members, each member of the outer pair rotatably connected to a member of the inner pair, the members of the outer pair hingedly connected by a first hinge, and the members of the inner pair hingedly connected by a second hinge, each outer pair member configured to limit rotation of a rotatably connected inner pair member between a fully extracted position in one rotational direction and a fully closed position in an opposite rotational direction, so that in the fully extracted position the first and second hinges cooperate to place the stand in an open position, so that in the fully closed position the first and second hinges cannot operate, and so that in the fully closed position the inner pair aligns with the outer pair between members of the outer pair.

20. The interretractable stand of claim 19 wherein, in the fully closed position, the members of the outer pair form a channel enclosing the inner pair.

* * * * *